United States Patent [19]
Wyers

[11] Patent Number: 6,102,371
[45] Date of Patent: Aug. 15, 2000

[54] STRAP TENSIONING AND COLLECTING DEVICE

[76] Inventor: Philip W. Wyers, 6746 S. Ivy Ct., Englewood, Colo. 80111

[21] Appl. No.: 08/728,892

[22] Filed: Oct. 10, 1996

Related U.S. Application Data

[60] Provisional application No. 60/005,224, Oct. 12, 1995.

[51] Int. Cl.⁷ .............................. B25B 25/00; B65H 75/28
[52] U.S. Cl. ...................... 254/218; 24/68 CD; 254/375; 242/388.1; 242/396.6; 410/103
[58] Field of Search .................................. 254/217, 218, 254/223, 369, 375, 376, 242, 382; 242/388.1, 388.2, 388.3, 388.4, 388.5, 388.6, 388.7, 532.6, 546.1, 396.6; 410/100, 103; 24/68 CD, 68 BT, 191

[56] References Cited

U.S. PATENT DOCUMENTS

| | | |
|---|---|---|
| 3,804,368 | 4/1974 | Bailey . |
| 4,622,721 | 11/1986 | Smetz et al. . |
| 5,316,266 | 5/1994 | Chou . |
| 5,611,520 | 3/1997 | Soderstrom .............................. 254/218 |

FOREIGN PATENT DOCUMENTS

| | | |
|---|---|---|
| 93/00222 | 9/1993 | WIPO . |

*Primary Examiner*—Katherine Matecki

[57] ABSTRACT

A strap tensioning and collecting device disclosed has a variable length strap and a fixed length strap operatively associated with a strap storage section and a strap tensioning section. The strap storage section includes a spool housing and a spool in the housing mounted for rotation about an axis with the spool having exposed serrated edges extending beyond the walls of the housing so that the user holding the device with one hand may use the thumb to rotate the spool. The variable length strap extends through the strap tensioning section and has a lever arm which upon rotation selectively decreases the length of the strap to place a tension on the straps when the straps are connected at free ends to a fixed location. In one embodiment the strap storage section and strap tensioning sections are on a common one-piece frame and in a second embodiment a conventional ratchet-type strap tensioning device having its own second frame releasably fastens to the first frame to enable the strap tensioning device to be quickly removed from the first frame. In this embodiment there is provided means to prevent the strap tensioning device from rotating relative to the strap storage section.

1 Claim, 6 Drawing Sheets

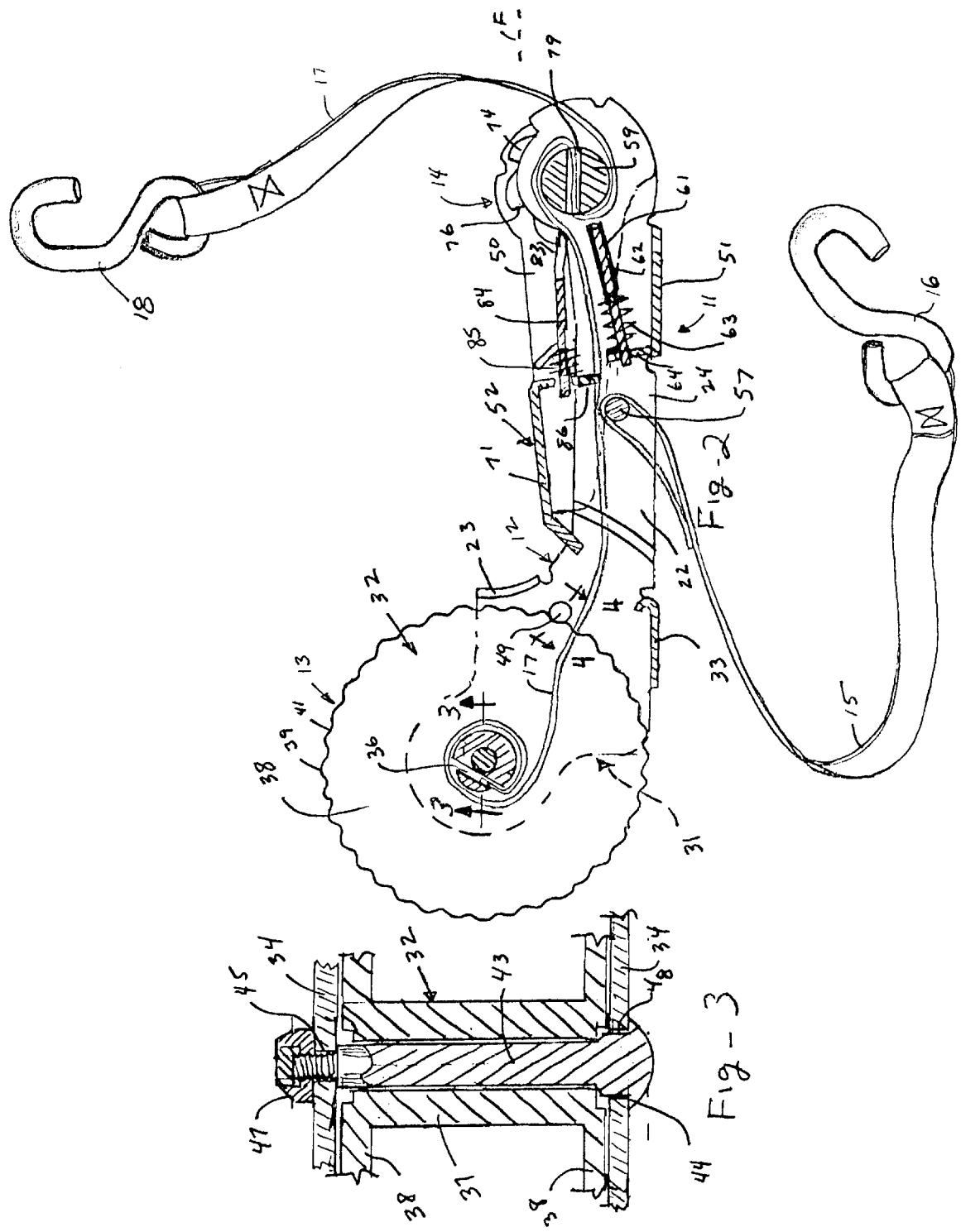

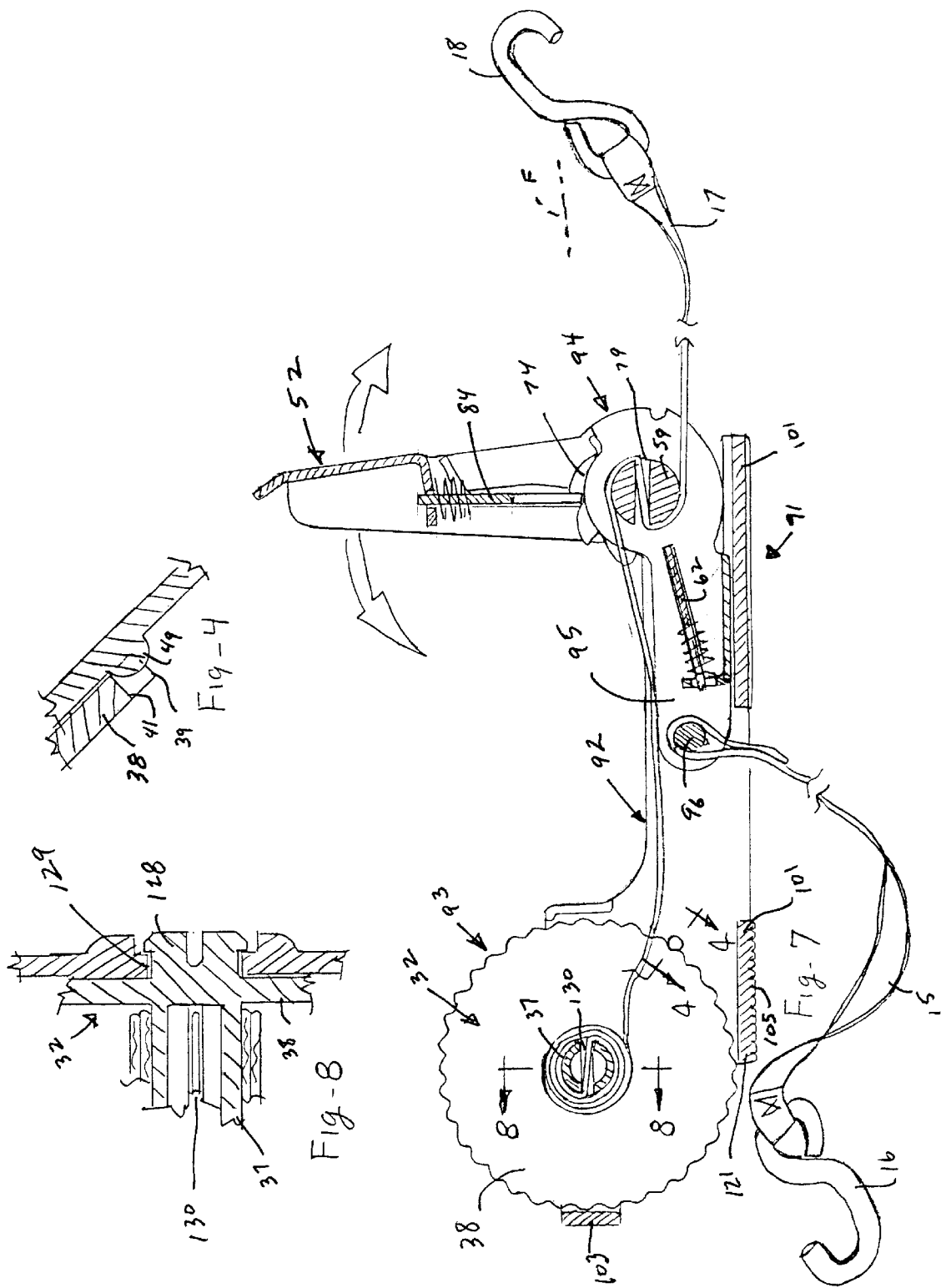

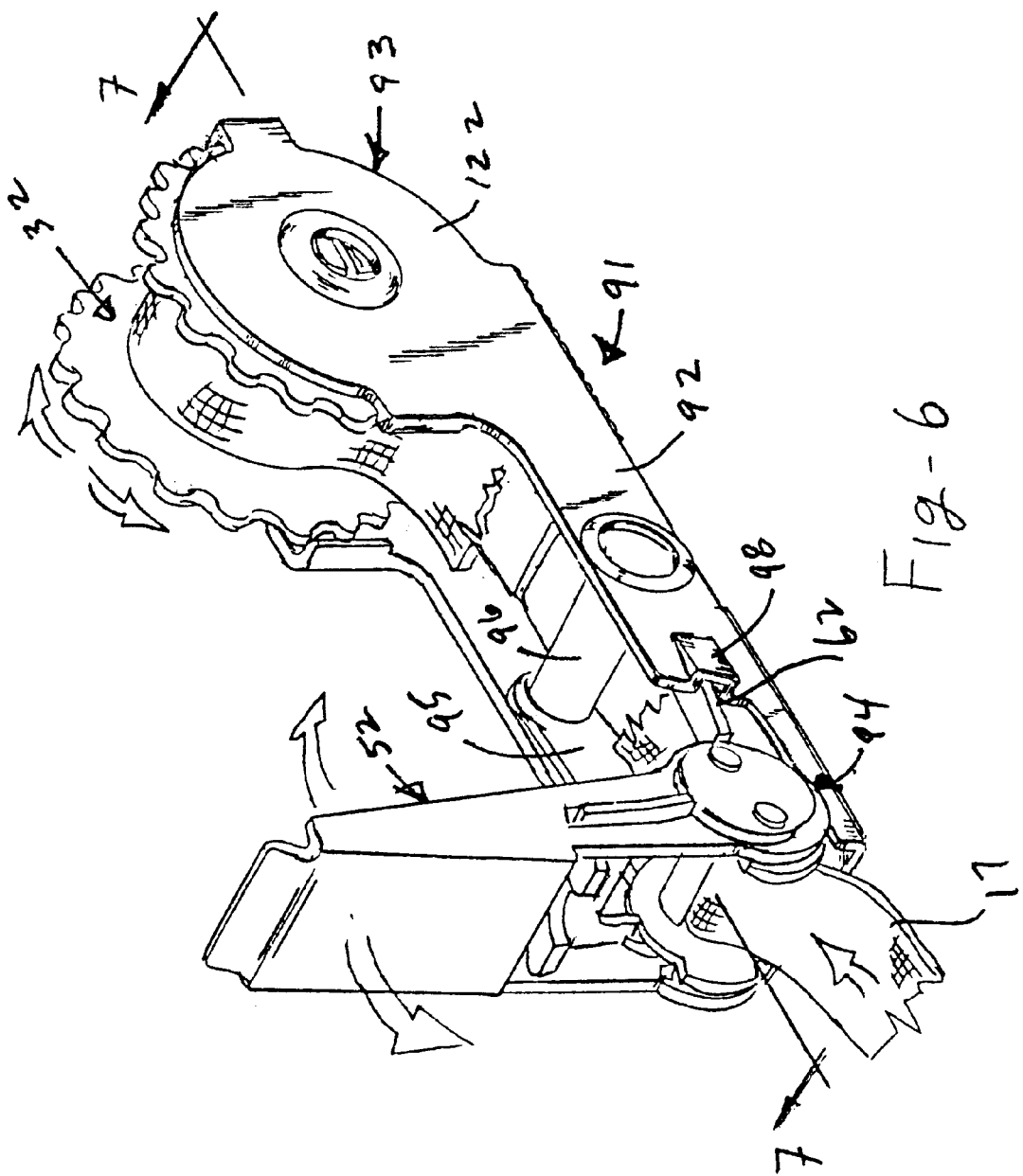

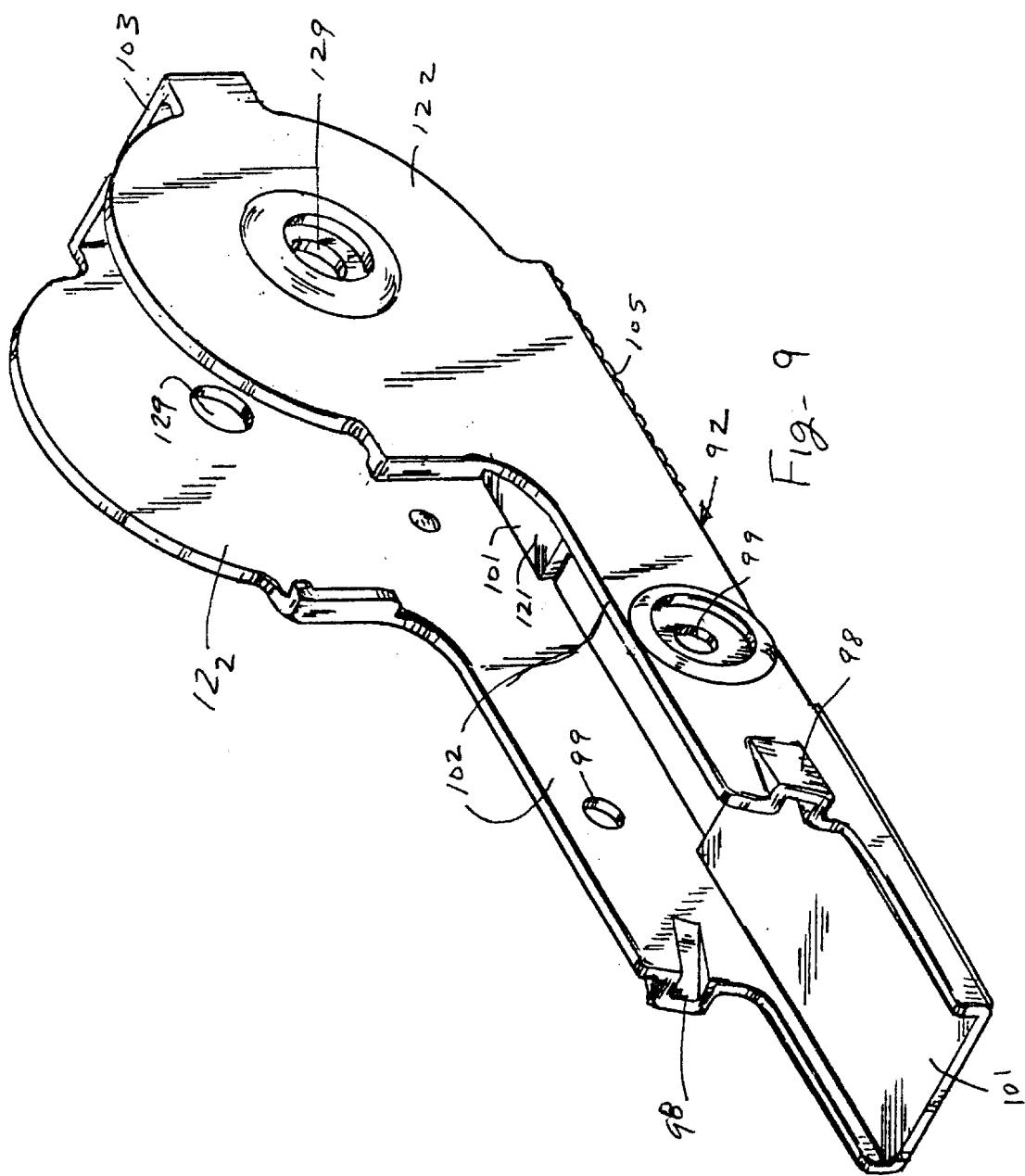

STRAP TENSIONING AND COLLECTING DEVICE

This application claims benefit of Provisional application Ser. No. 60/005,224 Oct. 12, 1995.

TECHNICAL FIELD

This invention relates to tensioning devices for straps that are used in securing objects or cargo for transportation or against stationary objects and more particularly to an improved strap tensioning and collecting device.

BACKGROUND ART

Some of the drawbacks of known strap tensioning devices are size, difficulties in holding and operating and the twisting of the straps.

Bailey U.S. Pat. No. 3,804,368, Smetz et al. U.S. Pat. No. 4,622,721 and Chou U.S. Pat. No. 5,316,266 are examples of known prior art ratchet tensioners. They are not easily operated with one hand and do not have an independent turn roll to roll up excess strap.

Soderstrom PCT/SE93/00222 discloses a strap collector in which an internal shaft is rotated by an external handle but there is no ability for the device to be operated by either right or left handed users.

DISCLOSURE OF THE INVENTION

In accordance with the present invention there is provided a strap tensioning and collecting device which includes a frame, a strap storage section at one end of the frame and a strap tensioning section at the other end of the frame. In one embodiment a single piece metal frame provides the housing and support for both sections and in a second embodiment there are two separate interconnected sections. The strap storage section has a housing portion with opposed side wall portions, a bottom wall portion and a front cross-wall portion and supports internally thereof a rotatable spool. The spool has a core portion and end portions at opposite ends of the core portion having external peripheral serrations in the form of a series of alternating bumps and recesses. The frame housing portion is cut out along the rear end to expose the bumps and recesses along the rear, along the top and along the bottom so that the user holding the device in the hand can readily advance the spool to wind up the excess strap while holding the device in one hand. In a second embodiment the main frame is molded plastic and the tensioning section is a separate ratchet-type tensing device that attaches to the main frame.

BRIEF DESCRIPTION OF THE DRAWINGS

Details of this invention are described in connection with the accompanying drawings which like parts bear similar reference numerals in which:

FIG. 2 is a sectional view taken along line 2—2 of FIG. 1.

FIG. 3 is a sectional view taken along line 3—3 of FIG. 2.

FIG. 4 is a sectional view taken along line 4—4 of FIG. 2.

FIG. 6 is a perspective view of a second embodiment of a strap tensioning and collecting device embodying features of the present invention with the lever arm shown in a raised position.

FIG. 7 is a sectional view taken along line 7—7 of FIG. 6.

FIG. 8 is a sectional view taken along line 8—8 of FIG. 7.

FIG. 9 is a perspective view of the frame for the device shown in FIGS. 6–8.

DETAILED DESCRIPTION

Figure 1:
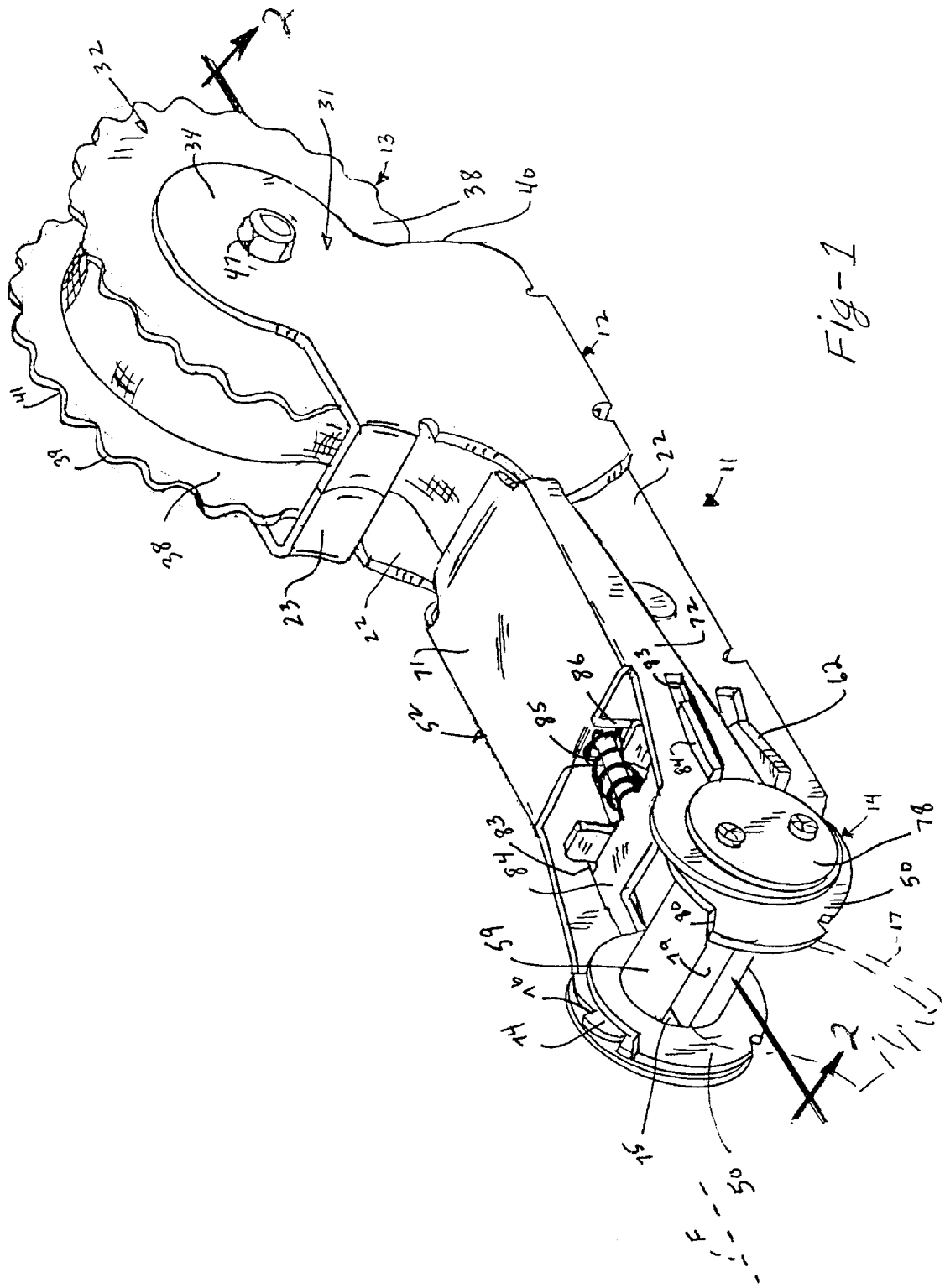
FIG. 1 is a perspective view of a first embodiment of a strap tensioning device embodying features of the present invention with the lever arm shown in a retracted or closed position.

Referring now to FIGS. 1–4 there is shown a strap tensioning and collecting device 11 which generally stated includes a frame 12, a strap storage section 13 at one end (rear) of the frame and a strap tensioning section 14 at the other end (front) of the frame 12 which in combination are of a size to be hand held and operated. There is provided a fixed length strap 15 with a hook 16 at the one end of the frame and a variable length strap 17 having a hook 18 at the other end. In general, the strap tensioning section 14 is operated to shorten the adjustable length strap 17 in one operation and pays out needed excess strap from the storage section 13 as required when the lever arm is moved forward and a pulling pressure is applied to the free end of the variable length strap 17 in another operation.

Figure 5:
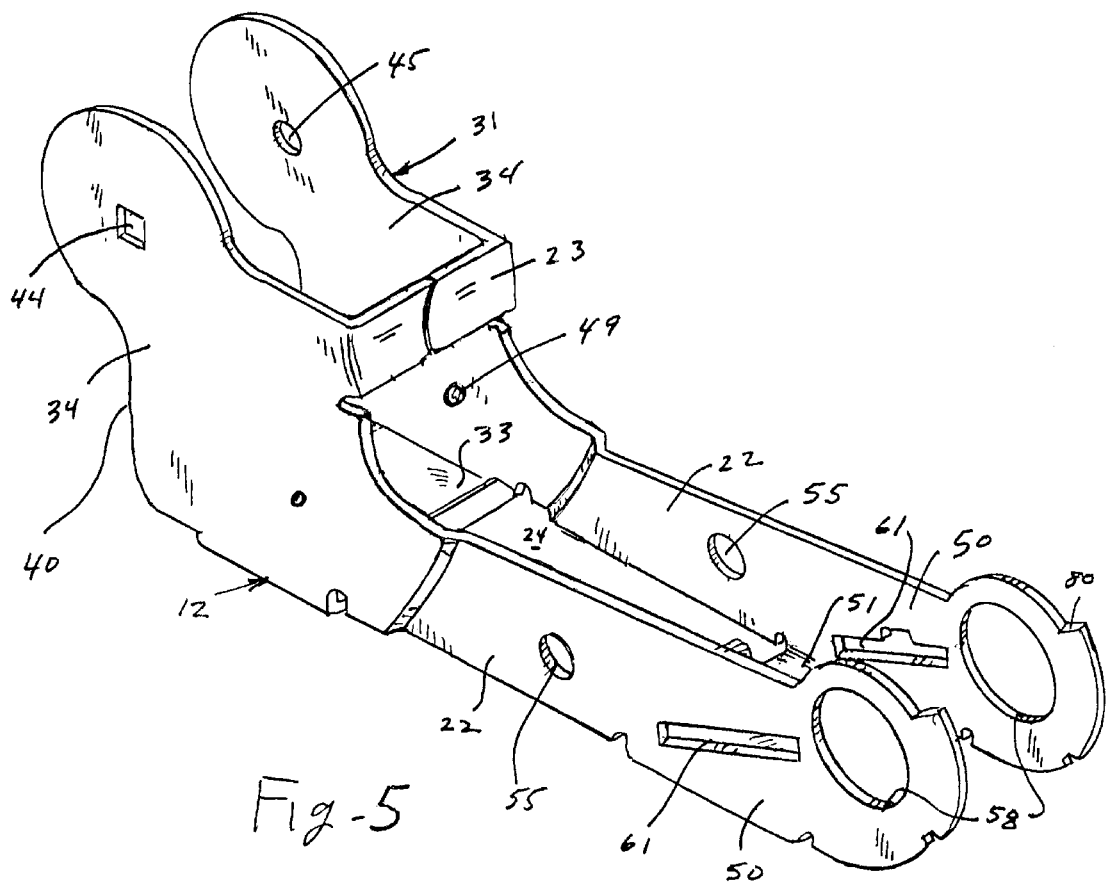
FIG. 5 is a perspective view of the frame for the device shown in FIGS. 1–4.

The frame 12 shown in general is channel-shaped and of a one-piece or integral construction having a bottom wall and a pair of opposed side walls 22 connected to and extending out from the side of the bottom wall with a front cross-wall 23 and an open cut out bottom area 24. This frame 12 preferably is die cut or stamped from a flat, relatively thin sheet metal material and is shaped into the channel-like configuration shown best in FIG. 5.

The storage section 13 is like a reel or cassette having an outer housing 31 that contains a spool 32 mounted for rotation about an axis in the housing. The housing 31 includes a bottom wall portion 33, a pair of spaced side wall portions 34 connected to the sides of the bottom wall portion and the front cross-wall 23 which are provided by a rear part of the above described frame 12.

The spool 32 has a hollow core portion 37 of relatively small diameter on which the strap is wrapped with a pair of circular end portions 38 at opposite ends of the core portion 37 that are made integral with or a unitary part of the core portion so the spool is a unitary or one integrally formed member. The core portion 37 has an offset slot 36 outside the bolt 43 through which the strap will extend to allow the strap to wrap on the core portion of the spool. The peripheral surface of each end portion 38 is textured or serrated having a series of alternating curved bumps 39 and curved recesses 41 resembling a sinusoidal wave. A bolt 43 having a slightly smaller diameter threaded portion than the bolt shaft to create a shoulder extends through apertures 44 and 45 in the side wall portions 34 and the core portion 37 and has a nut 47 threaded on the end of the bolt for supporting the spool 32 for free rotation. Aperture 44 is of a square shape to receive a square section 48 of the bolt head to prevent rotation of the bolt when nut 47 is tightened. Aperture 45 is of a round shape smaller than the non-threaded portion of bolt 43, but allowing passage of its threaded end portion so as to prevent over tightening of side wall portions against the spool. The side wall portions 34 are generally circular in shape having a diameter less than the diameter of the end portions of the spool and there is a cut-out area 40 at the rear of the side wall portions so the peripheral edges of the spool 32 are exposed at the top, rear and bottom of the housing 31. This enables the user to easily turn the spool as with the thumb to take up excess strap. The spool 32 may be considered a low tension spool since there is no tension thereon. A semicircular bump 49 inside the side wall portion 34 engages the bumps 39 and recesses 41 applying drag to the unwinding of the spool 32 to prevent the spool from free wheeling rotation and accidental unwinding of strap. The use of an oversized internal integral spool keeps the overall device narrow and compact for use and storage.

The strap tensioning section 14 includes a pair of side wall portions 50 and a bottom wall portion 51 which are provided by the front part of the above described frame 12 and are used to support a lever arm 52 for pivotal movement. The construction and arrangement of the tensioning section 14 is a common construction and arrangement used to tension straps but is described herein for an understanding of the present invention. The first embodiment including side wall portions 50 and bottom wall portion 51 is usually a separate structure as is shown in the second embodiment described hereafter. There are a pair of aligned holes 55 in the side wall portions 50 and a bolt or rivet 57 extends through the holes and fastens to the side wall portions 50. The side wall portions have a second pair of larger aligned holes 58 at the forward end portion which receives and supports shaft 59. There are a pair of aligned slots 61 in the side wall portions 50 and a flat pawl 62 is slidably movable in the slots 61. A spring 63 held by a base tab 64 is used to bias the pawl 62 to a forward position. Pawl 62 is used to lock the shaft 59 against rotation when the strap is taut.

The lever arm 52 is channel-shaped and has a top wall 71 and a pair of spaced side walls 72 connected to the sides of the top wall 71. There are a pair of aligned openings (not shown) in the side walls 72 that align with openings 58 and through which shaft 59 extends. A pair of axially spaced ratchet wheels 74 are carried on and rotate with the shaft 59 at opposite ends thereof.

The shaft 59 is a high tension shaft because the strap tension applies load tension thereto and as shown is constructed in two arcuate sections which are held apart by diametral sections 75 of the ratchet wheels 74. Each ratchet wheel has peripheral teeth 76. An end flange (not shown) is provided at one end of each shaft section and an end cap 78 is riveted to the other end of the shaft sections. The shaft 59 then is split and has a diametral slot 79 through which the strap will extend. There are a pair of spaced aligned slots 83 in the lever arm side walls 72 in which a pawl 84 is guided and slides. A spring 85 is held by a tab 86 to urge the pawl 84 against the teeth 76 of the ratchet wheels.

In operation when the lever arm 52 is moved from the retracted position shown in FIGS. 1 and 2 to an upright position pawl 84 engages the teeth of the ratchet wheel and rotates shaft 59 to pull strap from the spool 32. The lever arm 52 is stopped in the up position by having the pawl 84 engage stops 80 on the frame 12. A repetitive back and forth movement of the lever arm between these positions shortens the variable length strap 17 causing high tension winding on the shaft 59 and at the same time unwinds strap from the excess strap retention spool. Pawl 62 engages the ratchet wheels to hold the shaft against reverse rotation. When the lever arm 52 is in the up position and a pressure is applied to spring 85 to release pawl 84 the lever arm 52 will rotate to an extended position indicated in dashed lines at F. In this position the shaft 59 is free to rotate and the strap 17 free to be lengthened.

The second embodiment of a strap tensioning and collecting device 91 shown in FIGS. 6–9 in general has a main frame 92, storage section 93, and tensioning section 94. This embodiment has similar parts to the first embodiment but differs from the first embodiment in that the main frame 92 is like a cassette and preferably is a molded polymer plastic. The tensioning section 94 is a separate part having a separate frame which is a connecting arm 95 having a bolt or rivet 96 that readily removably fastens to a main frame 92. This tensioning section 94 is a conventional off the shelf ratchet-type strap tensioning part.

The main frame 92 includes a bottom wall 101 and a pair of spaced side walls 102 extending up from opposite sides of the bottom wall. A rear cross-wall 103 connects at the rear of the side walls. The bottom wall has a serrated or textured bottom surface 105 to prevent slippage when supported on a smooth surface.

The storage section 93 has an outer housing 131 with a bottom wall portion 121, a pair of spaced side wall portions 122 and a rear wall 103. Outer housing 131 is provided by the frame 92. The spool 32 is supported for rotation in the housing 131 about an axis. This spool has a hollow core portion and has end members with bumps like the spool above described. The periphery of the spool extends beyond the spool housing at the top, rear and bottom as above described and the device operates in the same manner as the first embodiment. The core portion has a male extension 128 at each end that snap fits into a hole 129 in each side wall portion so as to support the spool for rotation and allow the spool to be readily removed from the housing. This spool has a diametral slot 130 through which the strap extends.

The tensioning section 94 has the connecting arm 95 and the connecting arm connects to the frame 92 by a rivet 96 with flat heads or a bolt and nut. The frame 92 is provided with a pair of aligned holes 99 to accommodate the rivet 96. Otherwise the structure and operation is the same as the tensioning section 14 above described. The side walls have inside tapered channel sections 98 and the outer edges of pawl 62 slide into the channel sections as seen in FIG. 6.

Both holes 99 and 129 have exterior raised surface portions so the heads of the rivets or bolts or nuts are recessed therein.

Although the present invention has been described with a certain degree of particularity, it is understood that the present disclosure has been made by way of example and that changes in details of structure may be made without departing from the spirit thereof.

What is claimed is:

1. A strap tensioning and collecting device comprising:
   a frame,
   a strap storage section at one end of said frame, said strap storage section including a spool housing and a spool in said housing on which is wound a first strap, said housing having opposed side walls with outer peripheral edges, said spool being disposed between said side walls, said spool having a core portion and a pair of opposed radially extending end portions at opposite ends of said core portion, said end portions having exposed peripheral edges that extend radially beyond said outer peripheral edges for engagement by the hand of a user to rotate said spool,
   a strap tensioning section including a pivotal lever arm at the other end of said frame, said first strap extending though said strap tensioning section so that actuation of said lever arm will selectively increase and decrease the length of said first strap, a second strap attached at one end to said frame, whereby when an opposite end of said first strap is attached at a first location and an opposite end of said second strap is attached at a second location spaced from said first location a tension is applied to said first strap by actuating said lever arm, said spool further having a hollow core portion with a pair of circular end portions at opposite ends of said core portion, said end portions being made integral with said core portions, a peripheral surface of each said end portions being serrated by having a series of alternating curved bumps and curved recesses resembling a sinusoidal wave, said spool housing having a bump inside each of said side walls that engages said bumps and recesses of said spool for applying drag to the unwinding of said spool to prevent said spool from free wheeling rotation and accidental unwinding of said first strap.

\* \* \* \* \*